United States Patent [19]

Panissidi

[11] 4,229,136
[45] Oct. 21, 1980

[54] PROGRAMMABLE AIR PRESSURE COUNTERBALANCE SYSTEM FOR A MANIPULATOR

[75] Inventor: Hugo A. Panissidi, Peekskill, N.Y.

[73] Assignee: International Business Machines Corporation, Armonk, N.Y.

[21] Appl. No.: 21,647

[22] Filed: Mar. 19, 1979

[51] Int. Cl.³ .............................................. B66C 1/42
[52] U.S. Cl. ................................... 414/673; 414/719; 414/730; 414/753
[58] Field of Search ............... 414/601, 602, 673, 719, 414/730, 753

[56] References Cited

U.S. PATENT DOCUMENTS 3,756,563  9/1973  Stone .............................. 294/64 R X

FOREIGN PATENT DOCUMENTS 2814549  10/1978  Fed. Rep. of Germany ........... 414/730

Primary Examiner—Robert G. Sheridan
Assistant Examiner—George F. Abraham
Attorney, Agent, or Firm—Philip Young

[57] ABSTRACT

An air pressure counterbalance system is provided for an X Y Z orthogonal manipulator wherein the effect of gravity on a manipulator arm joint is counterbalanced both while hydraulic pressure is supplied to the hydraulic motors and also when the motive power is suspended. The air pressure counterbalance force is produced by a piston operating in an air cylinder in the direction of the gravity axis as the manipulator hand is raised or lowered. A selected constant air pressure is supplied to the counterbalance cylinder through an air pressure regulating system. In a preferred embodiment, a program-controlled counterbalance system is provided wherein the weights of various tools to be grasped by the manipulator fingers during a program are stored in CPU memory. The manipulator program selects the appropriate counterbalancing force to compensate for the predetermined tool weight and adjusts an air pressure regulator accordingly.

17 Claims, 7 Drawing Figures

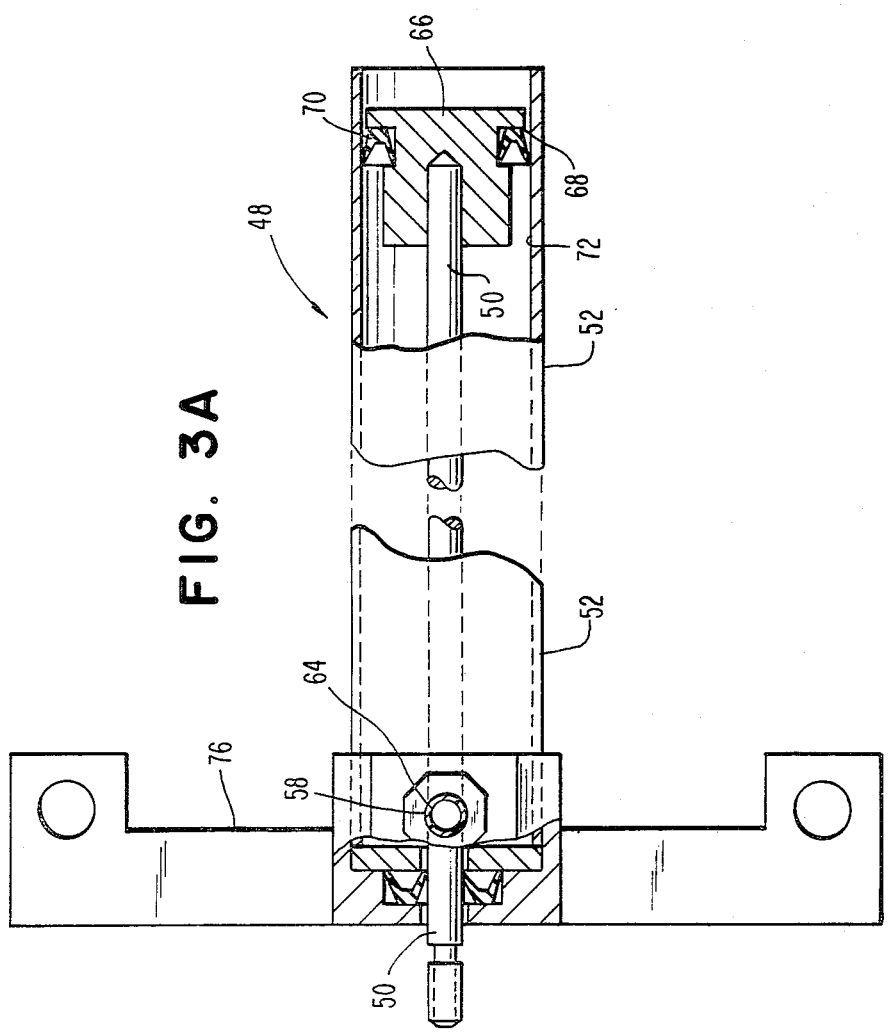

PROGRAMMABLE AIR PRESSURE COUNTERBALANCE SYSTEM FOR A MANIPULATOR

DESCRIPTION

Technical Field

The present invention relates to manipulator systems, and more particularly to manipulators of the type having counterbalance means for the manipulator arms and drive motors associated therewith.

BACKGROUND ART

Linear hydraulic drive systems supply three orthogonal motions in programmable manipulators such as that described in U.S. Pat. No. 4,001,556 to Folchi et al. Such drive systems permit the gripper assembly to be positioned at any desired location within a prescribed area. Generally, a joint interconnects the X Y and Z linear arms which are driven relative to each other by motors by individual X Y and Z motors mounted at each interconnecting joint. In such X Y Z orthogonal manipulator systems, the gravity forces on the robot joints associated with the Z-axis is continuously present while the system is in operation and the arm drive motors turned on. Also, when the Z-axis motor is in the off condition, the gravity forces tend to collapse the arms in a downward direction.

Prior art systems for providing counterbalance forces to manipulators includes the use of counterweights such as in U.S. Pat. No. 3,661,276 to Wiesener. However, the use of weights and countermasses are disadvantageous in that they introduce a substantial additional mass into the system. The counterweights are often not only cumbersome, but require additional driving energy to accelerate the mass. The counterweights also take up additional space as well as often requiring substantial system design changes to accommodate load modifications. Another form of counterbalance measure used in manipulator type systems is that of a spring counterbalance such as that used in the material handling apparatus disclosed by Mosher in U.S. Pat. No. 3,608,743. The use of springs is disadvantageous in applications where a constant counterbalance force is required since the spring does not provide a constant force. One other form of means for counteracting the collapse of the arm system of a manipulator is the use of locking means such as brakes or air driven clamps for holding the arm in position when the motor driving power is removed. Here, however, no balancing force is provided when the arm drive motors are in operation, and the time lag inherent in brake systems for turn-on must be compensated or dealt with in the system operation.

In manipulator systems the weight of various tools, such as power screwdrivers, riveters, soldering irons, welding torches, etc., place differing substantial loads on the manipulator fingers and arms. These loads can be substantial and introduce errors into the motor drive servo system. For example, where a force compensation for the unloaded arms is set for 60 pounds and the program introduces a 30-pound tool to be picked up by the fingers to perform an assembly function, the servo offset null could be of sufficient magnitude to substantially effect the stability of the mechanical drive system. Thus, some automatic compensating force would be desirable to accommodate the various tool weights that would be grasped by the fingers.

It is an object of the present invention to provide a counterbalance system for a robot manipulator which provides a constant counterbalance force against the gravity forces. It is another object to provide a counterbalance system which provides a constant counterbalancing force in the Z-gravity direction for an X Y Z orthogonal manipulator. It is another object to provide a counterbalance system for a robot manipulator which is simple and adds minimal mass to the manipulator. It is a further object to provide a counterbalance system for a robot manipulator which automatically compensates for the various tool weights and objects handled by the robot grippers.

BRIEF SUMMARY OF THE INVENTION

An air pressure counterbalance system is provided for an X Y Z orthogonal manipulator wherein the effect of gravity on the manipulator arm joint is counterbalanced both while hydraulic pressure is supplied to the hydraulic motors and also when the motive power is suspended. The air pressure counterbalance force is produced by a piston operating in an air cylinder in the Z-direction of the gravity axis as the manipulator hand is raised or lowered by activation of the Z-axis drive motor. A selected air pressure is supplied to the counterbalance cylinder through an air pressure regulating system. In one embodiment, the piston rod is rigidly attached to a Z-axis arm joint and moves up and down in unison therewith as the arm joint is raised and lowered by a motor located on such Z-joint. Here, the joint rides along a stationary Z-axis arm to which is fixedly attached to the cylinder in which the piston moves.

In a preferred embodiment, the counterbalance system is program-controlled wherein the weights of various tools to be grasped by the manipulator fingers during a program are stored in CPU memory. At the appropriate times during the assembly operation, the manipulator program selects the counterbalancing force to compensate for both the predetermined tool weight as well as the weight of the manipulator arm assembly and adjusts an air pressure regulator accordingly.

BRIEF DESCRIPTION OF THE DRAWINGS

FIGS. 3A and 3B show side and end views, respectively, partially in cross-section, of the counterbalance air cylinder assembly.

DESCRIPTION OF THE PREFERRED EMBODIMENTS

Figure 1:
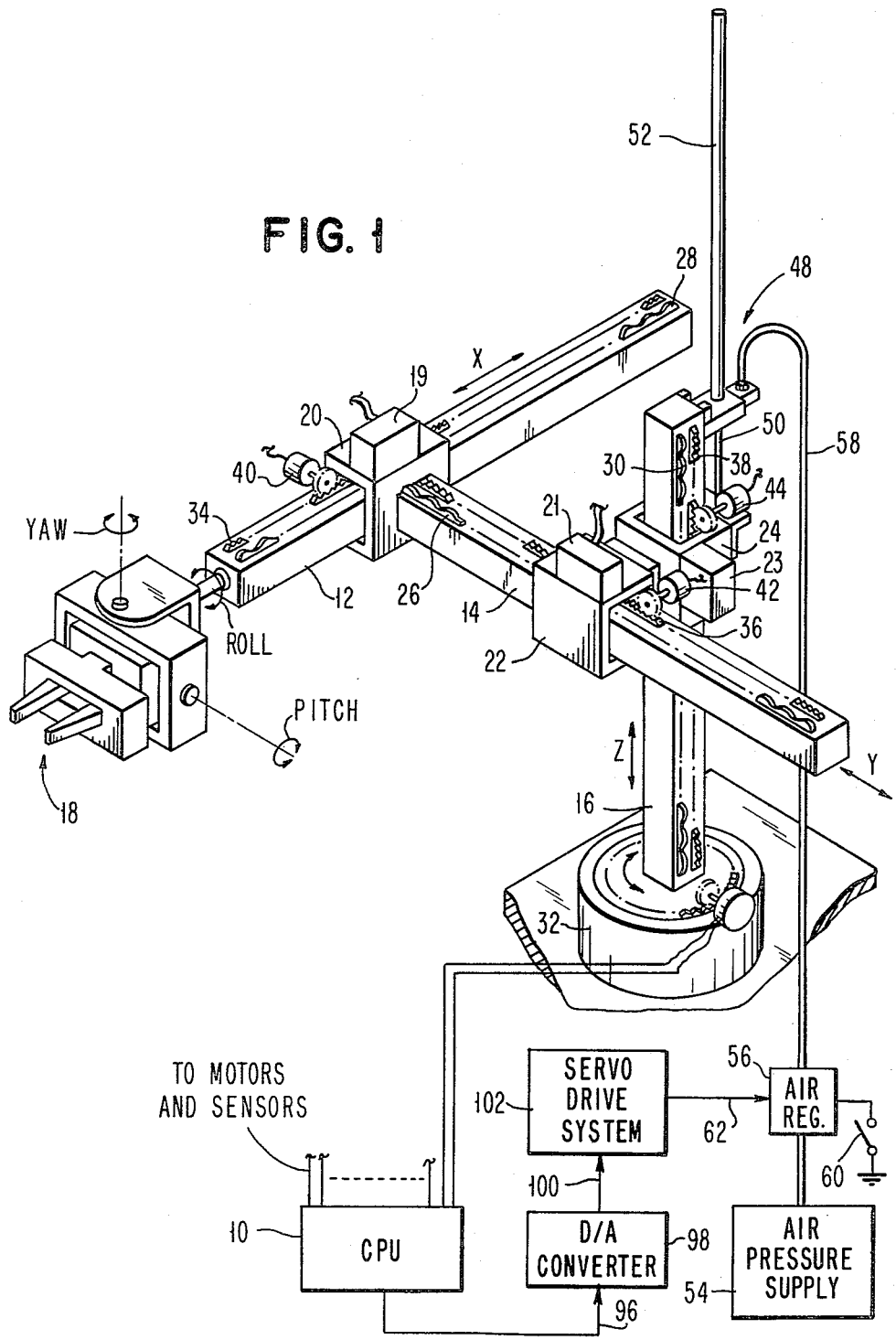
FIG. 1 shows a perspective view of a computer-controlled manipulator employing the programmable air pressure counterbalance system in accordance with the present invention.

FIG. 1 shows a manipulator controlled by a central processing unit 10 having three mutually perpendicular X Y and Z arm segments 12, 14 and 16 for providing X Y and Z directions of motion of gripper fingers 18. The arm segments 12, 14 and 16 are slidably connected together by holders or joints 20, 22 and 24 to provide an orthogonal manipulator arm similar to that shown in U.S. Pat. No. 4,001,556 to Folchi et al issued on Jan. 4, 1977.

The positioning mechanism for the manipulator hand and fingers also includes a Y-axis motor drive on joint 22 which operatively drives the arm 14 by means of a Y-axis drive cam 26, an X-axis motor drive 19 on joint 20 which operatively drives an X-axis arm 12 by means of a drive cam 28, and a Z-axis motor drive 23 on joint 24 which drives such joint 24 along the Z-axis arm 16 by means of drive cam 30. The Z-axis cam 30 is mounted on upright arm 16 which is mounted at its lower end in a rotatable base 32. Positional signals indicative of the displacements of the X, Y arms and Z joint by their respective drive motors 19, 21 and 23 is provided by potentiometer gear racks 34, 36 and 38 extending along respective manipulator arms. Potentiometers 40, 42 and 44 are operatively mounted so that their shaft gears engage with respective potentiometer gear racks. In operation, the longitudinal movements of the manipulator arms and joints and their potentimeter gear racks change the angular position of the respective potentiometer shafts, thereby directly changing its electrical output. An X Y Z orthogonal manipulator comprising the motor drive and cam system is described in U.S. Pat. No. 3,848,515 to B. G. Gardineer and H. A. Panissidi. In this patent, a linear hydraulic motor includes a cyclical linear parabolic cam drive rack mounted on each manipulator arm for producing linear displacement of the arms as a plurality of motor pistons are actuated against the cam rack.

Referring again to FIG. 1, the manipulator system includes a piston rod 50 which is fixedly attached at one end to the Z-axis joint 24 and an air cylinder 52 cooperating with the piston rod 50. The piston rod 50 and air cylinder 52 constitute the air cylinder assembly 48. The air cylinder 52 is fixedly attached to the Z-axis arm 16. An air pressure supply 54 provides a source of air pressure via a regulator 56 and pressure lines 58 to the air cylinder assembly 48 to cause an upward force on the piston rod 50. The regulator 56 is program controlled by the CPU 10 via a D/A converter 98 and a servo drive system 102, the details of which are provided in FIG. 4. Further details of the air cylinder assembly 48 are shown and described with reference to FIGS. 2A and 2B and FIGS. 3A and 3B.

Figures 2A, 2B:
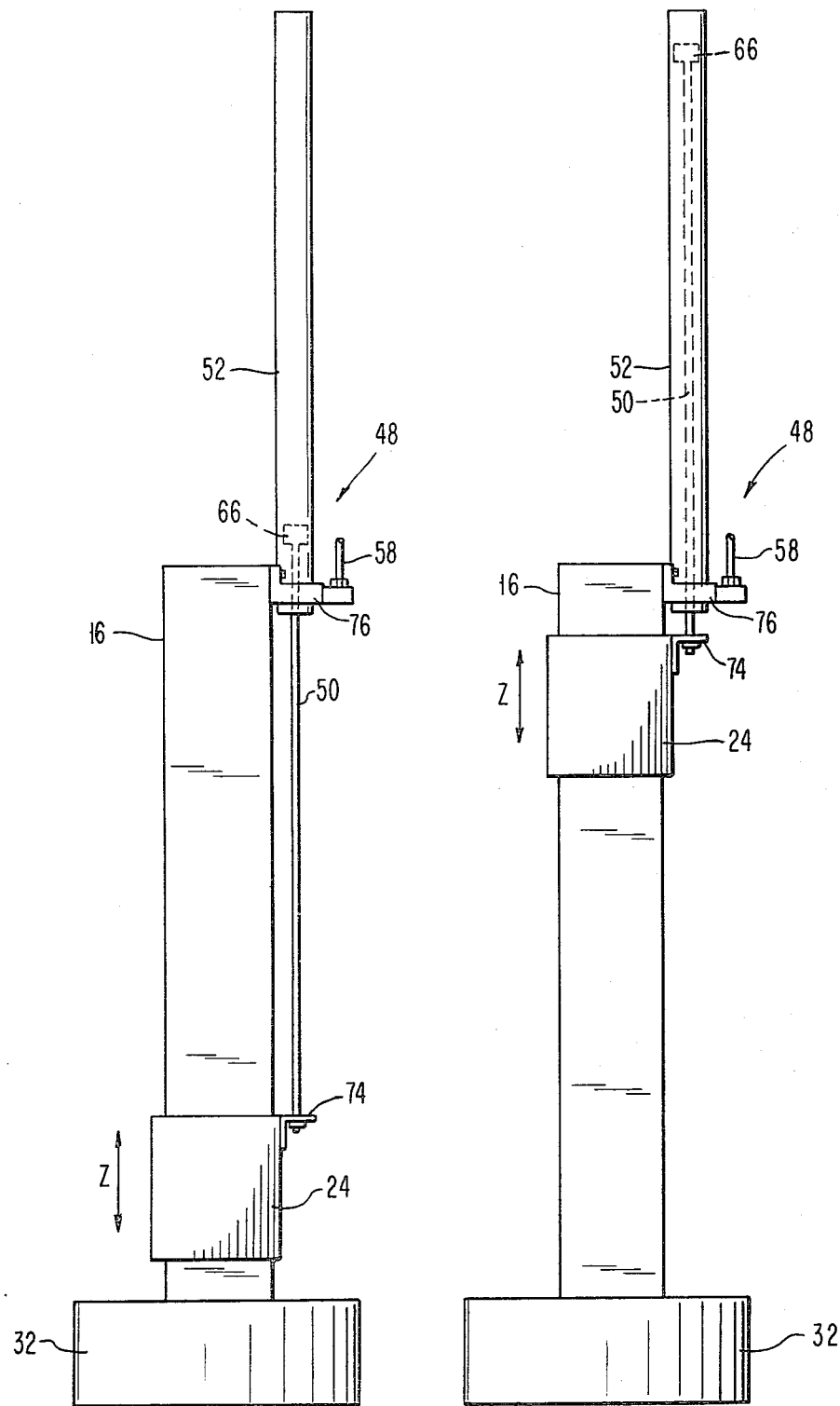
FIGS. 2A and 2B show the air pressure counterbalance system and the Z-axis manipulator arm with the arm joint in two different positions along the Z-axis arm.

Referring to FIG. 2A, there is shown the Z-axis arm 16 and the air cylinder 52 at a point where the Z-axis joint 24 is in its lower most position while FIG. 2B shows the assembly with the joint 24 in its raised position. The air pressure regulated supply line 58 is connected to a port 64 (see FIGS. 3A and 3B) in the air cylinder 52 and provides a constant pressure against a piston 66 attached to the piston rod 50. As shown in FIGS. 3A and 3B, piston 66 has a circumferential groove 68 supporting a cup seal 70 providing sealing action between the piston 66 and the inner wall 72 of the air cylinder 52. The cup seal 70 may comprise a conventional U-cup seal.

Referring again to FIGS. 2A and 2B, the piston rod 50 is attached at its lower end to the manipulator joint 24 by means of an arm bracket 74 such that piston rod 50 moves vertically with such joint 24.

Figure 5:
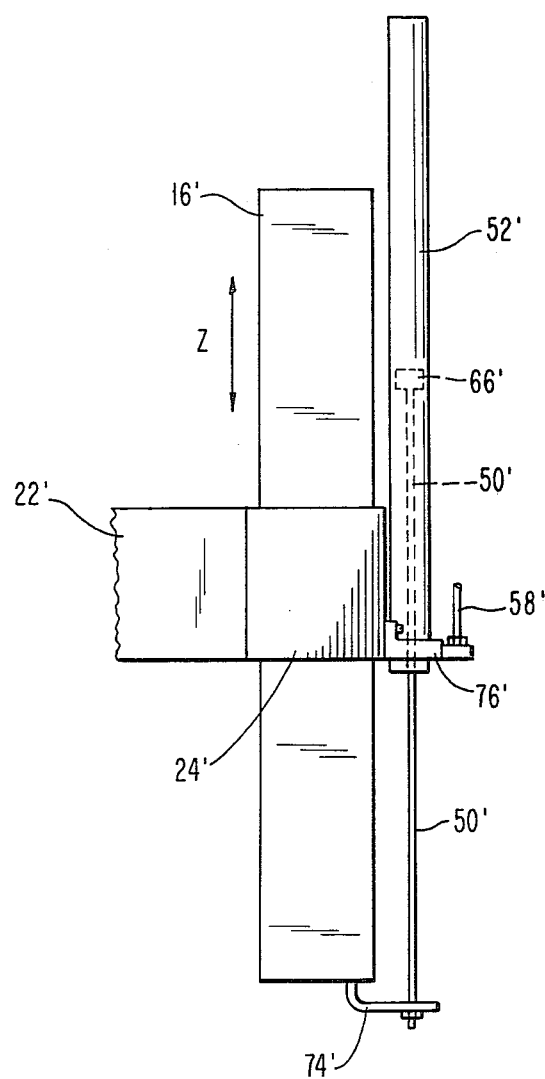
FIG. 5 shows an alternate arrangement for the manipulator arm and air cylinder assembly.

In the embodiment described above, the Z-axis arm 16 is fixed while the arm joint 24 is vertically traversed via motive means. It is to be understood that the manipulator could alternately be designed with a movable Z-axis arm and a fixed Z-axis joint, as is shown in FIG. 5. In the embodiment shown in FIG. 5, the air cylinder 52' is fixedly attached to the Z-axis joint 24' by means of a bracket 76' such that the piston rod 50' moves in unison with the arm 16'. In this alternate embodiment, the primed numerals indicate the same functional elements as those shown in the preceding figures with the unprimed numerals. The piston rod 50' is fixedly attached at its lower end to the movable arm 16' by means of the bracket 74'. The Z-axis joint 24' is held stationary relative to the arm 16' when the associated drive motor is actuated since the arm 16' is not fixed to any stationary object such as the base 32 shown in FIG. 1.

Figure 4:
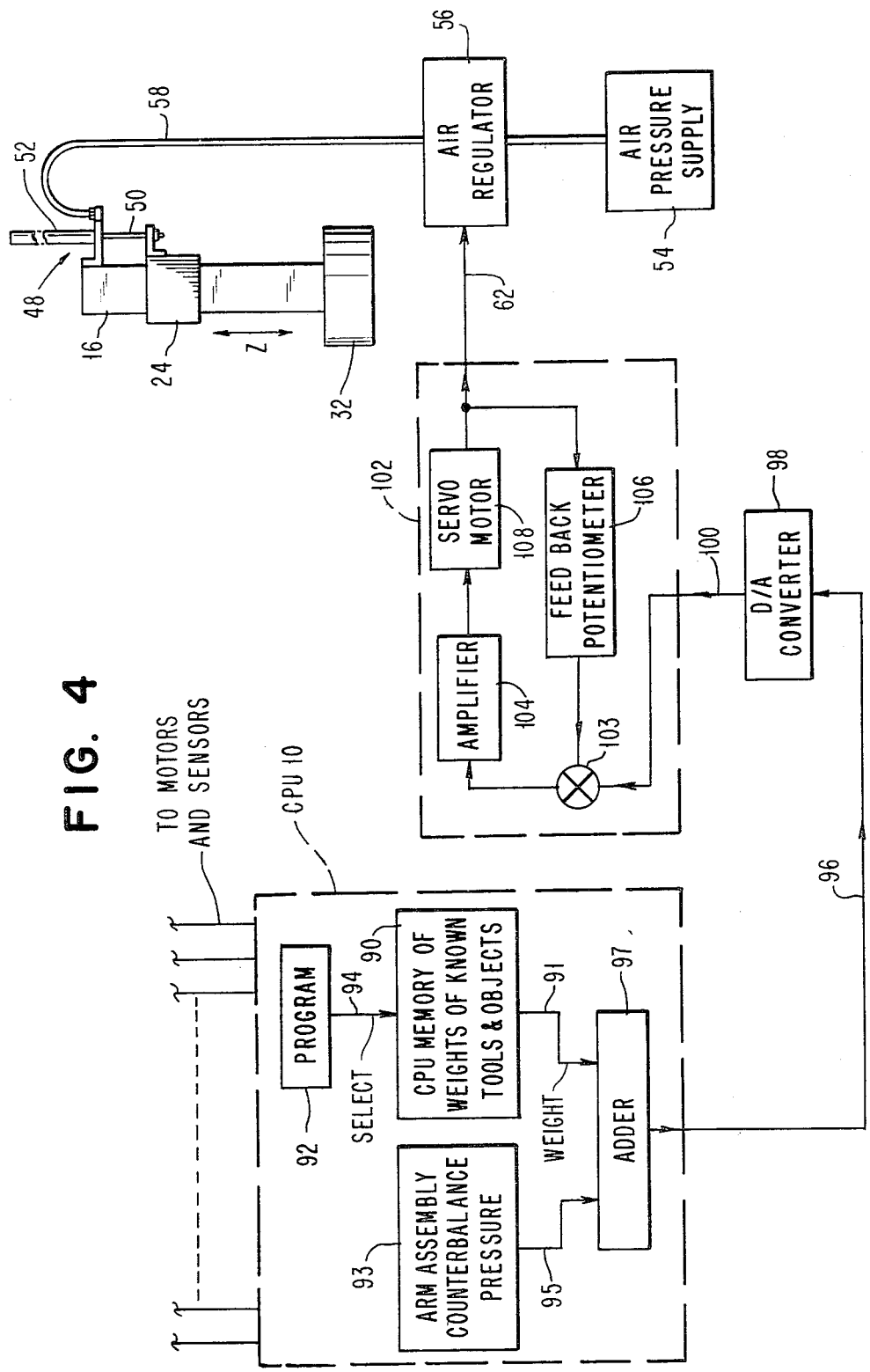
FIG. 4 is a functional block diagram of the program control system in the CPU and the servo drive system for controlling the air pressure regulator for the counterbalance air cylinder assembly.

Referring to FIG. 4, there is shown a functional block diagram of the program control system in the CPU 10 and the servo drive system 102 for controlling the air pressure regulator 56 for the counterbalance air cylinder assembly 48. More specifically the CPU 10 essentially provides a voltage for setting and controlling the regulator 56. This pressure setting voltage is determined in the CPU 10 by means of the system shown in the dotted line block 10 of FIG. 4. The CPU 10 includes a CPU memory 90 which includes stored weights of tools and objects which are known to be grasped and manipulated during the course of an assembly procedure. The assembly program 92 includes data such as positional and pressure sensing data, action selection data, location data, velocity control data and motor drive data. Program 92 also contains the commands for grasping selected tools at one or more points in an assembly procedure. Prior to the time when a particular object or tool is to be grasped, the program 92 provides a tool select signal on line 94 to the memory 90 which in turn provides a digital output on line 91 representing the predetermined weight of the selected tool or object. The signal on line 91 is applied to an adder 97 which also receives a signal on output line 95 from a register 93. Register 93 stores a predetermined measure of the arm assembly counterbalance pressure required for compensating for the weight of the manipulator arm assembly. Thus, the output line 96 of adder 97 indicates the appropriate counterbalancing force to compensate for both the predetermined tool weight as well as the weight of the manipulator arm assembly.

The digital signal on output line 96 is converted to analog form by means of a digital-to-analog (D/A) converter 98. The output line 100 of D/A converter 98 is connected to the servo drive system 102 which includes a summing device 103, an amplifier 104, a servo motor 108 and a feedback potentiometer 106 connected in conventional servo arrangement. The voltage on line 100 to the summing device 103 serves to drive the servo motor 108 through the amplifier 104 to control the pressure setting of the air regulator 56 monitored by the feedback potentiometer 106. When the voltage of the feedback potentiometer 106 cancels the voltage on line 100 from the D/A converter 98, the servo motor 108 will stop, setting the appropriate air pressure applied to the counterbalance cylinder assembly 48.

While the invention has been particularly shown and described with reference to preferred embodiments thereof, it will be understood by those skilled in the art that the foregoing and other changes in form and details may be made therein without departing from the spirit and scope of the invention. For example, the described use of program-control for providing predetermined counterbalance forces to the X Y Z orthogonal manipulator as described herein can be adapted for application in a non-orthogonal or articulated manipulator. In this case, the effect of gravity forces on the arms which are angularly related to the gravity axis can be programmed to compensate for changes in the magnitude of the gravity forces caused by the angular movement of the arms.

Having thus described my invention, what I now claim as new, and desire to secure by letters patent is:

1. A programmable fluid pressure counterbalance system for an X Y Z orthogonal manipulator comprising:
   an arm assembly for grasping objects;
   storage means for maintaining information representing a measure of the weights of objects to be grasped by said arm assembly in the course of executing an assembly program;
   adding means for adding the weight from said storage means to a predetermined counterbalance weight of said arm assembly to thereby provide a measure of the counterbalancing force required to compensate for the effects of gravity produced by an object to be grasped as well as the weight of said arm assembly;
   fluid pressure regulator means responsive to said adding means;
   a fluid pressure counterbalance cylinder and piston operatively connected to said arm assembly so as to provide forces in opposition to the gravity forces on said arm assembly, said fluid pressure counterbalance cylinder and piston being connected to said fluid pressure regulator to produce the predetermined counterbalancing force which compensates for the gravity forces of both said arm assembly and the grasped object.

2. A system as recited in claim 1 wherein said arm assembly includes a Z-axis arm extending up and down in the direction of the gravity axis, and an arm joint slidably connected to said Z-axis arm for movement relative to said arm, said arm assembly also including motive means operatively connected between said Z-axis arm and said joint for causing said relative movement, said fluid pressure counterbalance cylinder and piston being operatively connected between said Z-axis arm and said arm joint so as to provide a counterbalancing force to either said Z-axis arm or said piston.

3. A system as recited in claim 2 wherein said fluid pressure counterbalance cylinder is rigidly attached to said Z-axis arm and said fluid pressure counterbalance piston is rigidly attached at one end to said arm joint.

4. A system as recited in claim 1 further comprising a digital to analog converter connected to receive the output of said adding means, and a servo drive means connected to receive the output of said digital to analog converter, the output of said servo drive means being connected to said fluid pressure regulator means, whereby the servo drive means will set said fluid pressure regulator means to the appropriate pressure.

5. A system as recited in claim 4 wherein said servo drive means includes a summing junction connected to receive the output of said digital to analog converter, amplifier means connected to the output of said summing junction, a servo motor connected to the output of said amplifier, and a feedback potentiometer connected to receive the output of said servo motor and provide a feedback voltage to said summing junction, the output of said servo motor also being connected to said fluid pressure regulator means, whereby the voltage to the summing junction drives said servo motor to control the pressure setting of said fluid pressure regulator means at the setting where said feedback potentiometer equals the input from said digital to analog converter to said summing junction.

6. A programmable fluid pressure counterbalance system for a manipulator comprising:
   an arm assembly for grasping objects;
   storage means for maintaining information representing a measure of the predetermined gravity forces on said arm assembly in the course of executing an assembly program, said stored information representing the counterbalancing force required to compensate for the effects of gravity produced by an object to be grasped as well as the weight of said arm assembly;
   selecting means responsive to said assembly program for selecting said stored counterbalance force information at the appropriate times during the assembly execution;
   a fluid pressure regulator responsive to said selecting means for receiving the selected counterbalance force information; and
   a fluid pressure counterbalance cylinder and piston operatively connected to said arm assembly so as to provide forces in opposition to the gravity forces on said arm assembly, said fluid pressure counterbalance cylinder and piston being connected to said fluid pressure regulator to produce the predetermined counterbalancing force which compensates for the gravity forces of both said arm assembly and the grasped object.

7. A system as recited in claim 6, wherein said storage means comprises a portion of a CPU memory and said selecting means comprises a portion of a control program for the execution of the manipulator assembly program.

8. A system as recited in claim 6 wherein said arm assembly includes a Z-axis arm extending up and down in the direction of the gravity axis, and an arm joint slidably connected to said Z-axis arm for movement relative to said arm, said arm assembly also including motive means operatively connected between said Z-axis arm and said joint for causing said relative movement, said fluid pressure counterbalance cylinder and piston being operatively connected between said Z-axis arm and said arm joint so as to provide a counterbalancing force to either said Z-axis arm or said piston.

9. A system as recited in claim 8 wherein said fluid pressure counterbanalce cylinder is rigidly attached to said Z-axis arm and said fluid pressure counterbalance piston is rigidly attached at one end to said arm joint.

10. A system as recited in claim 6 further comprising a digital to analog converter connected to receive the output of said selecting means, and a servo drive means connected to receive the output of said digital to analog converter, the output of said servo drive means being connected to said fluid pressure regulator means, whereby the servo drive means will set said fluid pressure regulator means to the appropriate pressure.

11. A system as recited in claim 10 wherein said servo drive means includes a summing junction connected to receive the output of said digital to analog converter, amplifier means connected to the output of said summing junction, a servo motor connected to the output of said amplifier, and a feedback potentiometer connected to receive the output of said servo motor and provide a feedback voltage to said summing junction, the output of said servo motor also being connected to said fluid pressure regulator means, whereby the voltage to the summing junction drives said servo motor to control the pressure setting of said fluid pressure regulator means at the setting where said feedback potentiometer equals the input from said digital to analog converter to said summing junction.

12. A fluid pressure counterbalance system for a X Y Z orthogonal manipulator comprising:
an arm assembly for grasping objects, said arm assembly including a Z-axis manipulator arm extending up and down in the direction of the gravity axis;
an arm joint slidably connected to said Z-axis arm such that said joint and said arm move relative to one another along the Z-axis;
motive means for moving said manipulator arm and said arm joint relative to each other;
a fluid pressure counterbalance cylinder and piston operatively connected between said Z-axis manipulator arm and said arm joint;
a fluid pressure regulating means connected to said cylinder and piston to provide a constant pressure against said piston, said fluid pressure regulator means being set to that pressure which provides a constant counterbalancing force to compensate for the gravity forces on said Z-axis manipulator arm and joint.

13. A system as recited in claim 12, wherein said fluid pressure regulating means includes an air pressure supply.

14. A system as recited in claim 12, wherein said fluid pressure counterbalance cylinder is rigidly attached to said Z-axis arm and said fluid pressure counterbalance piston is rigidly attached at one end to said arm joint.

15. A system as recited in claim 14, wherein said Z-axis arm is stationary relative to said manipulator, while said arm joint is movable along said Z-axis relative to said manipulator.

16. A system as recited in claim 12, wherein said fluid pressure counterbalance cylinder is rigidly attached to said arm joint, and said fluid pressure counterbalance piston is rigidly attached at one end to said Z-axis arm.

17. A system as recited in claim 16, wherein said Z-axis arm is movable along the Z-axis.

* * * * *